(12) United States Patent
Cho

(10) Patent No.: US 6,252,746 B1
(45) Date of Patent: Jun. 26, 2001

(54) ACTUATOR OF HARD DISK DRIVE HAVING IMPROVED BOBBIN

(75) Inventor: Jong-Min Cho, Kyongsangbuk-do (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/372,757

(22) Filed: Aug. 11, 1999

(30) Foreign Application Priority Data

Sep. 19, 1998 (KR) .................................................. 98-38881

(51) Int. Cl.⁷ ...................................................... G11B 5/55
(52) U.S. Cl. ............................................................. 360/265.8
(58) Field of Search .............................. 360/265.8, 264.7, 360/265

(56) References Cited

U.S. PATENT DOCUMENTS

| | | |
|---|---|---|
| 4,702,555 | 10/1987 | Iguma et al. . |
| 5,043,964 | 8/1991 | Suzuki . |
| 5,289,445 | 2/1994 | Luecke . |
| 5,305,169 | 4/1994 | Anderson et al. . |
| 5,404,258 | 4/1995 | Arin et al. . |
| 5,555,228 | 9/1996 | Izuka . |
| 5,734,528 | 3/1998 | Jabbari et al. . |
| 5,790,348 | 8/1998 | Alfred et al. . |
| 6,061,206 | * 5/2000 | Foisy et al. ................. 360/265.8 |

FOREIGN PATENT DOCUMENTS

WO 92/10833 A1  6/1992 (WO) .

* cited by examiner

*Primary Examiner*—Craig A. Renner
(74) *Attorney, Agent, or Firm*—Robert E. Bushnell, Esq.

(57) ABSTRACT

Disclosed is an actuator of a hard disk drive. The actuator comprises a bobbin having an outside bobbin part made of plastic, an inside bobbin part of a lower height than the outside bobbin part, and a coil intervened between the outside bobbin part and the inside bobbin part by insert molding; a rib portion having a predetermined width and formed along a boundary region between the inside bobbin part and the coil such that it has the same height as the outside bobbin part; and a plurality of connecting portions having a selected width and each being branched from a center portion of the inside bobbin part and linked to a desired position on the rib portion such that it has the same height as the rib portion.

20 Claims, 4 Drawing Sheets

ACTUATOR OF HARD DISK DRIVE HAVING IMPROVED BOBBIN

CLAIM OF PRIORITY

This application makes reference to, incorporates the same herein, and claims all benefits accruing under 35 U.S.C. §119 from an application entitled Actuator of Hard Disk Drive earlier filed in the Korean Industrial Property Office on Sep. 19, 1998, and there duly assigned Ser. No. 98/38881, a copy of which is annexed hereto.

BACKGROUND OF THE INVENTION

1. Technical Field

The present invention relates to a hard disk drive, and more particularly to an actuator of a hard disk drive, which has a bobbin structured such that it can experience a uniform shrinkage while radiating heat after being injection-molded.

2. Related Art

Generally, a hard disk drive is used as an auxiliary memory of a computer, for recording information on a disk being a recording medium by converting a digital electronic pulse into a more permanent magnetic field or for reading out recorded information from the disk. Such a hard disk drive includes a disk for storing information data thereon, an actuator having a head for recording information to or reading information from the disk, a voice coil motor (VCM) for pivoting the actuator around a pivot shaft to a precise data position on the disk, and an interface for connecting electronic circuits and drives controlling the above components to a computer body.

I have found that unstable formations of bobbins of actuators can be extremely inconvenient. Efforts have been made to improve bobbins and actuators.

Exemplars of recent efforts in the art include U.S. Pat. No. 5,734,528 for Disc Drive Actuator Incorporating Injection Molding, Flying Leads, and Locking Flanges issued to Jabbari et al, U.S. Pat. No. 5,555,228 for Optical Head Having a Vertical Flat Plate Shaped Magnetic Circuit Containing a Tracking Coil and a Focusing Coil issued to Izuka, U.S. Pat. No. 5,404,258 for Hard Disk Drive Precision Head Positioner Having a Self-aligning Head Positioner/magnetic Coil Bobbin Interface issued to Arin et al., U.S. Pat. No. 5,305,169 for Rotary Actuator Disk Drive issued to Anderson et al., U.S. Pat. No. 5,289,445 for Suspension System for Focus Actuator of an Optical Disk Drive issued to Luecke, U.S. Pat. No. 5,043,964 for Linear Pickup Actuator for Moving an Optical Pickup in a Radial Direction of a Disk issued to Suzuki, and U.S. Pat. No. 4,702,555 for Optical System Drive for Optical Recording/reproducing Apparatus issued to Iguma et al.

While these recent efforts provide advantages, I note that they fail to adequately provide an efficiently improved actuator of a hard disk drive having an improved bobbin.

SUMMARY OF THE INVENTION

Accordingly, the present invention has been made in an effort to solve the problems occurring in the related art, and a primary object of the present invention is to provide an actuator of a hard disk drive, which has a bobbin structured such that it can experience a uniform shrinkage while radiating heat after being injection-molded.

Another object of the present invention is to provide an actuator of a hard disk drive, which has a bobbin structured such that it can prevent the actuator from being wrongly operated due to a nonuniform distribution of resonance frequencies.

In order to achieve the above objects and others, according to the present invention, there is provided an actuator of a hard disk drive, comprising: a bobbin having an outside bobbin part made of plastic, an inside bobbin part of a height lower than the outside bobbin part, and a coil intervened between the outside bobbin part and the inside bobbin part by insert molding; a rib portion having a predetermined width and formed along a boundary region between the inside bobbin part and the coil such that it has the same height as the outside bobbin part; and a plurality of connecting portions having a selected width and each being branched from a center portion of the inside bobbin part and linked to a desired position on the rib portion such that it has the same height as the rib portion.

To achieve these and other objects in accordance with the principles of the present invention, as embodied and broadly described, the present invention provides an apparatus, comprising: an actuator of a hard disk drive unit, said actuator having a first end including at least one read/write is head reading data from or writing data to at least one disk, and said actuator having a second end; a bobbin unit being located at said second end of said actuator, said bobbin unit including an outer region having a first height, an inner region having a second height less than said first height, and a coil separating said outer region from said inner region; a rib unit having a height equal to said first height and having a first predetermined width, said rib unit extending along a boundary region between said inner region and said coil, said boundary region being located at an outer periphery of said inner region away from a center area of said inner region; and a plurality of connecting units each having a respective first and second end, said first ends of said plurality of connecting units being coupled to said center area of said inner region, said second ends of said plurality of connecting units being coupled to said rib unit, said connecting units having a height equal to said first height.

To achieve these and other objects in accordance with the principles of the present invention, as embodied and broadly described, the present invention provides an apparatus, comprising: an actuator of a hard disk drive unit, said actuator having a first end including at least one read/write head reading data from or writing data to at least one disk, and said actuator having a second end; a bobbin unit being located at said second end of said actuator, said bobbin unit including an outer region, an inner region, and a coil separating said outer region from said inner region; a rib unit extending along a boundary region between said inner region and said coil, said boundary region being located at an outer periphery of said inner region away from a center area of said inner region; and a plurality of connecting units each having a respective first and second end, said first ends of said plurality of connecting units being coupled to said center area of said inner region, said second ends of said plurality of connecting units being coupled to said rib unit.

To achieve these and other objects in accordance with the principles of the present invention, as embodied and broadly described, the present invention provides an apparatus, comprising: an actuator of a hard disk drive unit, said actuator having a first end including at least one read/write head reading data from or writing data to at least one disk, said actuator having a second end, said actuator pivoting around a pivot shaft located between said first and second ends of said actuator; a bobbin unit being located at said second end of said actuator, said bobbin unit including an outer region, an inner region, and a coil separating said outer region from said inner region; a rib unit extending along a boundary region between said inner region and said coil, said boundary region being located at an outer periphery of said inner region away from a center area of said inner region, said rib unit having a first predetermined width; and a plurality of connecting units each having a respective first and second end, said first ends of said plurality of connecting units being coupled to said center area of said inner region, said second ends of said plurality of connecting units being coupled to said rib unit, said plurality of connecting units having a second predetermined width.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

Figure 1:
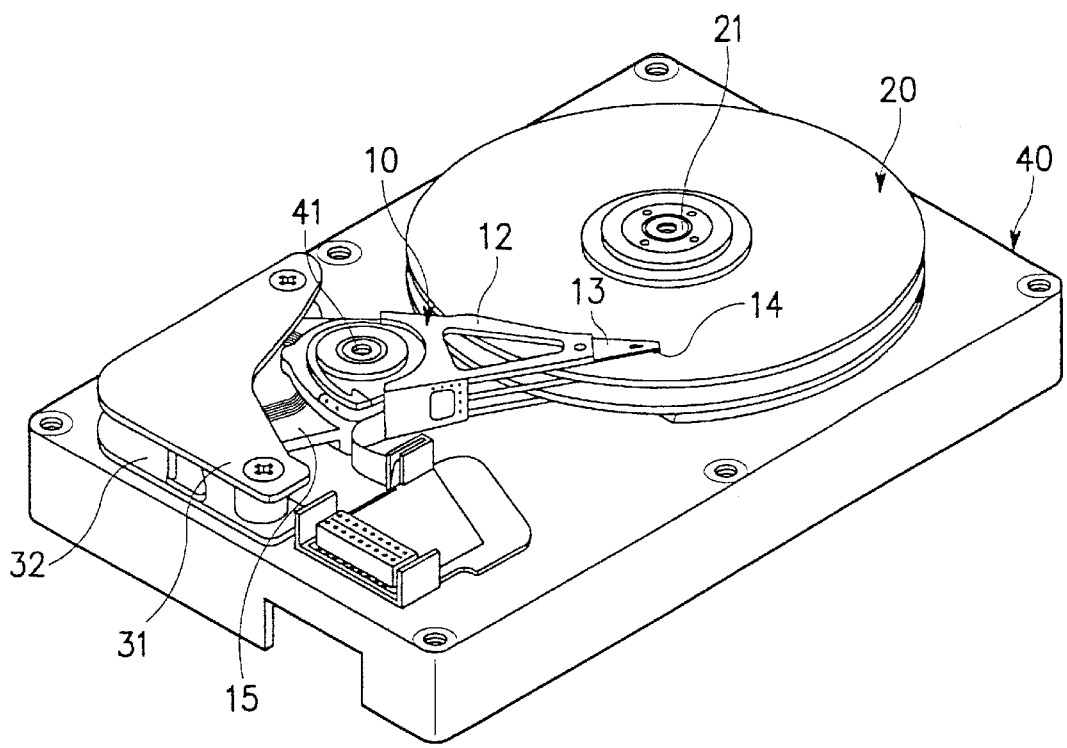
FIG. 1 is a perspective view illustrating a construction of a hard disk drive.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be under stood as being abroad, teaching disclosure directed to persons of skill in the appropriate arts, and not as limiting upon the present invention.

Reference will now be made in greater detail to the preferred embodiments of the present invention. In the drawings, the same or similar elements are denoted by the same reference numerals even though they are depicted in different drawings. In the following description of the present invention, a detailed description of known functions and configurations incorporated herein will be omitted when it may make the subject matter of the present invention rather unclear.

Referring to FIG. 1, there is shown a perspective view illustrating a construction of a hard disk drive. The hard disk drive includes a disk 20 which is a recording medium rotated at high speed by a spindle motor 21, an actuator 10 having a head 14 for recording or reading out information on or from the disk 20, a voice coil motor (VCM) for pivoting the head 14 of the actuator 10, which is loaded onto the disk 20, to a precise data position on the disk 20, and a base 40 for mounting the above components. The actuator 10 is mounted on the base 40 such that it can pivot around a pivot shaft 41, and the voice coil motor is arranged on the base 40 such that it is opposite to the head 14 loaded onto the disk 20. A printed circuit board (not shown) is provided on a lower surface of the base 40 to control pivoting movement of the actuator 10 and rotation of the spindle motor 21.

The voice coil motor has an upper yoke 31 and a lower yoke 32 each of which has a magnet and which are mounted on the base 40 such that they are spaced apart from each other by a predetermined distance, and a bobbin 15 which has a coil insert-molded adjacent an end of the actuator 10 and which is intervened between the upper yoke 31 and the lower yoke 32. Accordingly, by applying current to the coil of the bobbin 15, the head 14 of the actuator 10 can be pivoted to a precise information data position on the disk 20.

Figure 2:
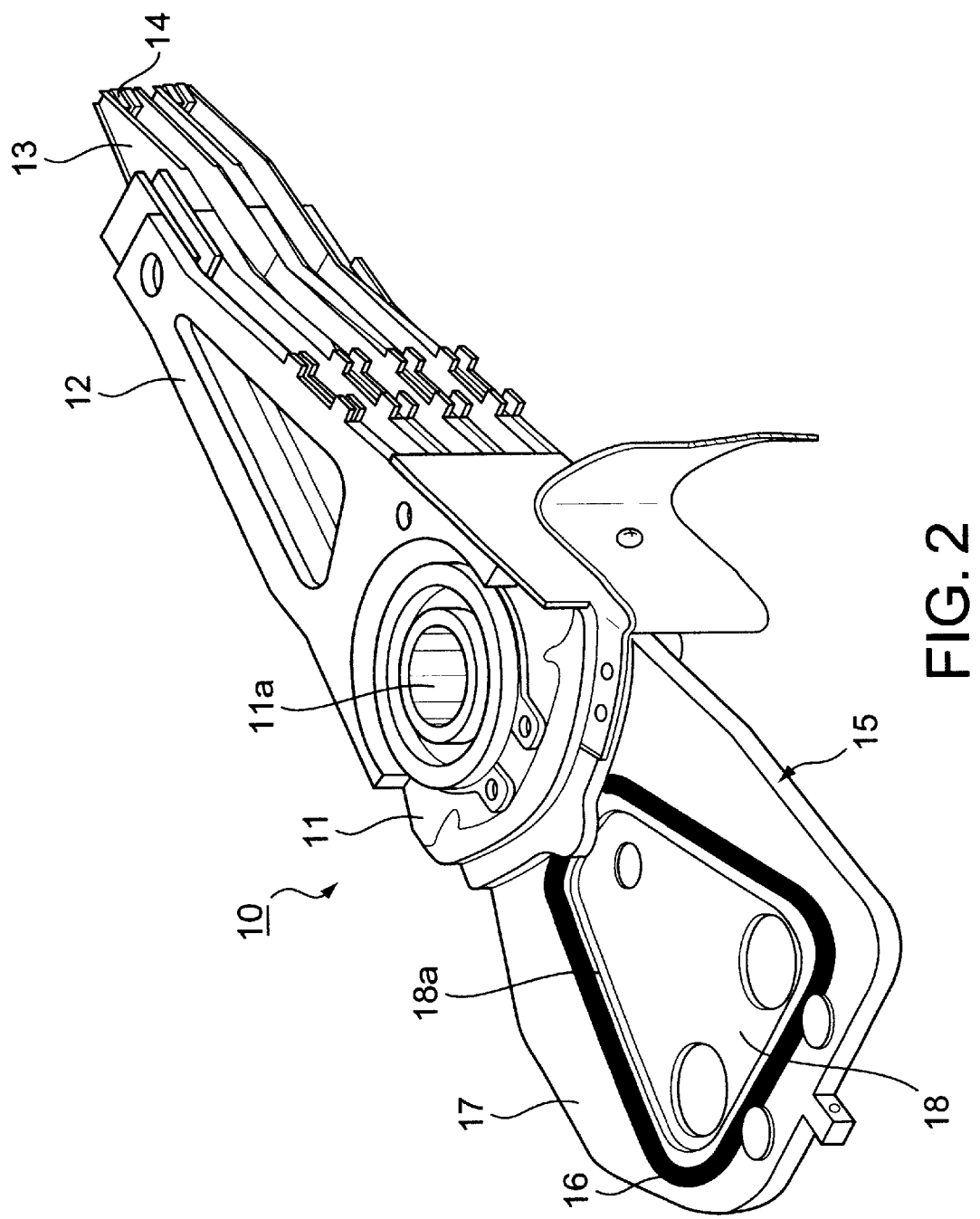
FIG. 2 is a perspective view illustrating an actuator of a hard disk drive.

Referring to FIG. 2, there is shown a perspective view illustrating an actuator of a hard disk drive. In the actuator 10 of FIG. 2, at one side of a pivot bearing 11a which is mounted to a body 11, there are disposed a plurality of arms 12 such that they are spaced apart one from another by a predetermined distance. A suspension 13 having the head 14 is secured to a distal end of each arm 12. The bobbin 15 having a plate-shaped configuration is provided to the other side of the pivot bearing 11a, and the coil 16 having a number of windings is insert-molded to a middle portion of the bobbin 15.

The bobbin 15 has an outside bobbin part 17 which is placed outside the coil 16 and an inside bobbin part 18 which is placed inside the coil 16. The inside bobbin part 18 has a height lower than that of the outside bobbin part 17. A rib portion 18a having a predetermined width no greater than 1 mm is formed along a boundary region between the inside bobbin part 18 and the coil 16. The rib portion 18a is formed such that it has the same height as the outside bobbin part 17. The rib portion 18a functions to minimize shrinkage of the bobbin 15 developed while radiating heat after the coil 16 is insert-molded to the bobbin 15, thereby to stably support the coil 16.

However, the actuator of FIGS. 1 and 2 can suffer from defects in that since only one rib portion is formed along the boundary region between the inside bobbin part and the coil, the bobbin cannot be uniformly shrunk while heat is radiated after injection molding, and according to this, deformations are caused in the bobbin. Hence, when the actuator is operated, resonance frequencies are non-uniformly distributed thereon, whereby the hard disk drive may be wrongly operated.

Figure 3:
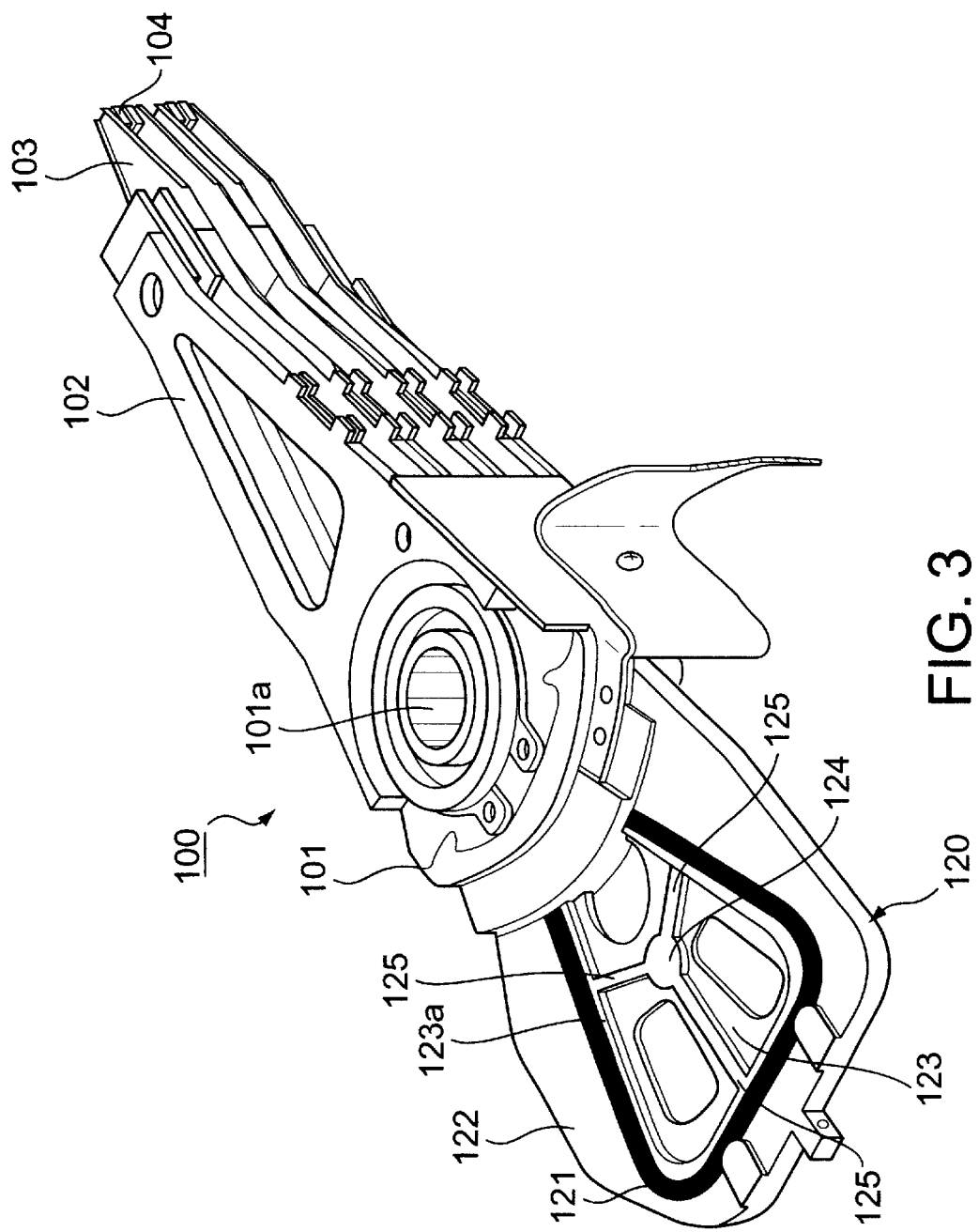
FIG. 3 is a perspective view illustrating an actuator of a hard disk drive, in accordance with the principles of the present invention.
Figure 4:
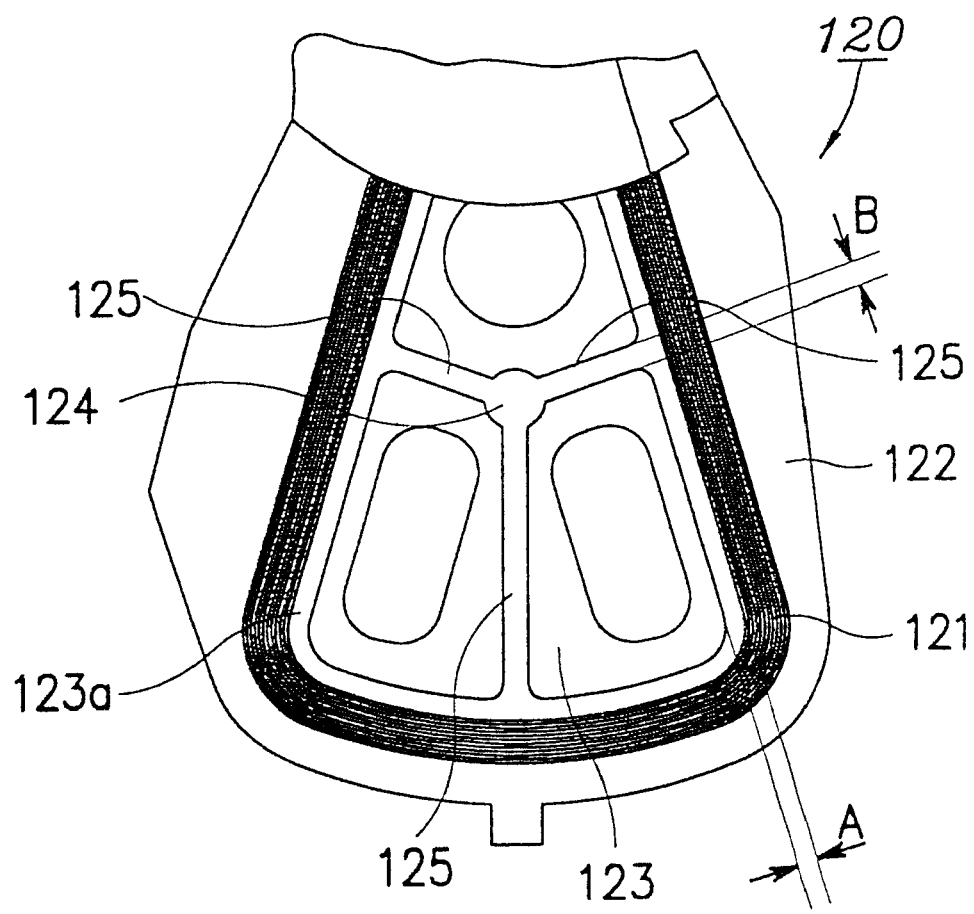
FIG. 4 is a partial plan view illustrating a bobbin of the actuator of FIG. 3, in accordance with the principles of the present invention.

FIG. 3 is a perspective view illustrating an actuator of a hard disk drive in accordance with an embodiment of the present invention, and FIG. 4 is a partial plan view illustrating a bobbin of the actuator of FIG. 3, in accordance with the principles of the present invention.

An actuator 100 according to the present invention is, as shown in FIGS. 3 and 4, structured such that a plurality of arms 102 and a bobbin 120 are opposed to each other at both sides of a body 101 to which a pivot bearing 101a is mounted. The plurality of arms 102 are disposed such that they are spaced apart one from another by a predetermined distance. A suspension 103 having a head 104 is secured to a distal end of each arm 102. Accordingly, a disk (not shown) being an information recording medium is inserted into a space defined between two adjacent arms 102, and the head 104 secured to an end of the suspension 103 is loaded on the disk.

The bobbin 120 is made of plastic and has an outside bobbin part 122 and an inside bobbin part 123. A coil 121 having a number of windings is integrally insert-molded to the bobbin 120 between the outside bobbin part 122 and the inside bobbin part 123. The inside bobbin part 123 has a height lower than that of the outside bobbin part 122. A rib portion 123a is formed along a boundary region between the inside bobbin part 123 and the coil 121 such that it has the same height as the outside bobbin part 122. The rib portion 123a has a width (A of FIG. 4) which is no less than 1 mm, for minimizing shrinkage after injection molding.

A plurality of connecting portions 125 having a selected width are formed such that each of them is branched from a center portion 124 of the inside bobbin part 123 and linked to a desired position on the rib portion 123a. The connecting portion 125 has the selected width (B of FIG. 4) which is no less than 1 mm. Each connecting portion 125 is formed such that it has the same height as the rib portion 123a. Further, the center portion 124 has a circular configuration and a diameter which is greater than the selected width of the connecting portion 125, for supporting the connecting portions 125.

Of course, although three connecting portions 125 are formed in the above embodiment, it is to be readily understood that at least four or five connecting portions can be formed according to another preferred embodiment of the present invention.

As a result, by a bobbin of an actuator according to the present invention, advantages are provided in that since an inside bobbin part placed inside a coil is reinforced by a plurality of connecting portions, a shrinkage phenomenon being developed while radiating heat after being injection-molded can proceed in a uniformly controlled manner, whereby it is possible to ensure a reliable and smooth operation of the actuator.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:
   an actuator of a hard disk drive unit, said actuator having a first end including at least one read/write head reading data from or writing data to at least one disk, and said actuator having a second end;
   a bobbin unit being located at said second end of said actuator, said bobbin unit including an outer region having a first height, an inner region having a second height less than said first height, and a coil separating said outer region from said inner region;
   a rib unit having a height equal to said first height and having a first predetermined width, said rib unit extending along a boundary region between said inner region and said coil, said boundary region being located at an outer periphery of said inner region away from a center area of said inner region; and
   a plurality of connecting units each having a respective first and second end, said first ends of said plurality of connecting units being coupled to said center area of said inner region, said second ends of said plurality of connecting units being coupled to said rib unit, said connecting units having a height equal to said first height.

2. The apparatus of claim 1, said outer region of said bobbin unit comprising a plastic material.

3. The apparatus of claim 1, said coil being insert molded to said bobbin unit between said outer and inner regions.

4. The apparatus of claim 1, said coil being energized in a first coil direction to provide a first force to rotate said at least one head in a first direction toward a center of said at least one disk, said coil being energized in a second coil direction opposite to said first coil direction to provide a second force to rotate said at least one head in a second direction opposite to said first direction toward an outer periphery of said at least one disk.

5. The apparatus of claim 1, said plurality of connecting units having a second predetermined width.

6. The apparatus of claim 1, said first predetermined width of said rib unit being no less than one millimeter.

7. The apparatus of claim 5, said center area of said inner region of said bobbin unit including a coupling unit, said first ends of said plurality of connecting units being coupled to said coupling unit at said center area of said inner region of said bobbin unit.

8. The apparatus of claim 7, said coupling unit at said center area of said inner region of said bobbin unit having a height equal to said first height.

9. The apparatus of claim 7, said coupling unit at said center area of said inner region of said bobbin unit having a circular configuration and having a diameter which is greater than said second predetermined width.

10. An apparatus, comprising:
    an actuator of a hard disk drive unit, said actuator having a first end including at least one read/write head reading data from or writing data to at least one disk, and said actuator having a second end;
    a bobbin unit being located at said second end of said actuator, said bobbin unit including an outer region, an inner region having a first height and stabilizing said bobbin unit, and a coil separating said outer region from said inner region;
    a rib unit extending along a boundary region between said inner region and said coil, said boundary region being located at an outer periphery of said inner region away from a center area of said inner region; and
    a plurality of connecting units each having a respective first and second end, said first ends of said plurality of connecting units being coupled to said center area of said inner region, said second ends of said plurality of connecting units being coupled to said rib unit, said connecting units having a second height different from said first height of said inner region of said bobbin unit.

11. The apparatus of claim 10, said coil being energized in a first coil direction to provide a first force to rotate said at least one head in a first direction toward a center of said at least one disk, said coil being energized in a second coil direction opposite to said first coil direction to provide a second force to rotate said at least one head in a second direction opposite to said first direction toward an outer periphery of said at least one disk.

12. An apparatus, comprising:
    an actuator of a hard disk drive unit, said actuator having a first end including at least one read/write head reading data from or writing data to at least one disk, and said actuator having a second end;
    a bobbin unit being located at said second end of said actuator, said bobbin unit including an outer region, an inner region, and a coil separating said outer region from said inner region;

a rib unit extending along a boundary region between said inner region and said coil, said boundary region being located at an outer periphery of said inner region away from a center area of said inner region; and a plurality of connecting units each having a respective first and second end, said first ends of said plurality of connecting units being coupled to said center area of said inner region, said second ends of said plurality of connecting units being coupled to said rib unit;

said coil being energized in a first coil direction to provide a first force to rotate said at least one head in a first direction toward a center of said at least one disk, said coil being energized in a second coil direction opposite to said first coil direction to provide a second force to rotate said at least one head in a second direction opposite to said first direction toward an outer periphery of said at least one disk;

said outer region of said bobbin unit having a first height, said inner region of said bobbin unit having a second height less than said first height, said rib unit having a height equal to said first height, and said connecting units having a height equal to said first height.

13. The apparatus of claim 10, said connecting units having a predetermined width being no less than one millimeter.

14. The apparatus of claim 10, said rib unit having a predetermined width being no less than one millimeter.

15. The apparatus of claim 10, said center area of said inner region of said bobbin unit including a coupling unit, said first ends of said plurality of connecting units being coupled to said coupling unit at said center area of said inner region of said bobbin unit.

16. The apparatus of claim 12, said center area of said inner region of said bobbin unit including a coupling unit, said first ends of said plurality of connecting units being coupled to said coupling unit at said center area of said inner region of said bobbin unit.

17. The apparatus of claim 16, said coupling unit at said center area of said inner region of said bobbin unit having a height equal to said first height, said plurality of connecting units corresponding to at least three connecting units.

18. An apparatus, comprising:

an actuator of a hard disk drive unit, said actuator having a first end including at least one read/write head reading data from or writing data to at least one disk, said actuator having a second end, said actuator pivoting around a pivot shaft located between said first and second ends of said actuator;

a bobbin being located at said second end of said actuator, said bobbin including an outer region unit, an inner region unit being perforated, and a coil separating said outer region unit from said inner region unit;

a rib unit extending along a boundary region between said inner region unit and said coil, said boundary region being located at an outer periphery of said inner region unit away from a center area of said inner region unit; and a plurality of connecting units coupled to said inner region unit, each having a respective first and second end, said first ends of said plurality of connecting units being coupled to said center area of said inner region unit, said second ends of said plurality of connecting units being coupled to said rib unit, said plurality of connecting units each having a predetermined width, said connecting units being formed and placed to strengthen and reinforce said inner region unit.

19. The apparatus of claim 18, further comprising:

a coupling unit being located at said center area of said inner region unit of said bobbin, said first ends of said plurality of connecting units being coupled to said coupling unit, said coupling unit having a circular configuration and a diameter greater than said predetermined width of each of said connecting units, said coupling unit being formed and placed to strengthen and reinforce said inner region unit.

20. An apparatus, comprising:

an actuator of a hard disk drive unit, said actuator having a first end including at least one read/write head reading data from or writing data to at least one disk, said actuator having a second end, said actuator pivoting around a pivot shaft located between said first and second ends of said actuator;

a bobbin unit being located at said second end of said actuator, said bobbin unit including an outer region, an inner region, and a coil separating said outer region from said inner region;

a rib unit extending along a boundary region between said inner region and said coil, said boundary region being located at an outer periphery of said inner region away from a center area of said inner region, said rib unit having a first predetermined width; and a plurality of connecting units each having a respective first and second end, said first ends of said plurality of connecting units being coupled to said center area of said inner region, said second ends of said plurality of connecting units being coupled to said rib unit, said plurality of connecting units having a second predetermined width;

said first predetermined width being one millimeter or more than one millimeter, said second predetermined width being one millimeter or more than one millimeter;

said outer region of said bobbin unit having a first height, said inner region of said bobbin unit having a second height less than said first height, said rib unit having a height equal to said first height, and said connecting units having a height equal to said first height.

* * * * *